US009589070B2

(12) United States Patent
Gitelman

(10) Patent No.: US 9,589,070 B2
(45) Date of Patent: Mar. 7, 2017

(54) METHOD AND SYSTEM FOR UPDATING A FILTER LOGIC EXPRESSION REPRESENTING A BOOLEAN FILTER

(75) Inventor: Alex Gitelman, Berkeley, CA (US)

(73) Assignee: salesforce.com, inc., San Francisco, CA (US)

( * ) Notice: Subject to any disclaimer, the term of this patent is extended or adjusted under 35 U.S.C. 154(b) by 736 days.

(21) Appl. No.: 13/566,095

(22) Filed: Aug. 3, 2012

(65) Prior Publication Data

US 2013/0091153 A1  Apr. 11, 2013

Related U.S. Application Data

(60) Provisional application No. 61/545,252, filed on Oct. 10, 2011.

(51) Int. Cl.
*G06F 17/30* (2006.01)
(52) U.S. Cl.
CPC .............................. *G06F 17/30967* (2013.01)
(58) Field of Classification Search
CPC ......... G06F 17/30967; G06F 17/30345; G06F 17/30424
See application file for complete search history.

(56) References Cited

U.S. PATENT DOCUMENTS

| 5,276,735 A | 1/1994 | Boebert et al. |
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz et al. |

(Continued)

FOREIGN PATENT DOCUMENTS

WO   2011/060306   5/2011

OTHER PUBLICATIONS

Saba, "Saba Announces Revolutionary Social Enterprise Platform," Press Release, Mar. 20, 2012, pp. 1-4, Redwood Shores, California.

(Continued)

*Primary Examiner* — Robert Beausoliel, Jr.
*Assistant Examiner* — Susan F Rayyan
(74) *Attorney, Agent, or Firm* — Dergosits & Noah LLP; Todd A. Noah

(57) ABSTRACT

A method for automatically updating a filter logic expression representing a Boolean filter comprising a plurality of search conditions is disclosed. The method includes receiving a first indication to remove a first search condition from a condition list comprising search conditions. Each search condition is associated with an identifier and the first search condition is associated with a first identifier, and the search conditions are listed in sequential order according to the associated identifier. In response to receiving the first indication, a second search condition associated with a second identifier that sequentially follows the first identifier is identified, and the second search condition is reassociated with a third identifier that immediately precedes the second identifier. A filter logic expression comprising a plurality of identifiers and operators and representing a Boolean filter is then modified by automatically replacing any reference to the second identifier with the third identifier.

20 Claims, 9 Drawing Sheets

(56) References Cited

U.S. PATENT DOCUMENTS

| | | |
|---|---|---|
| 5,819,038 A | 10/1998 | Carleton |
| 5,821,937 A | 10/1998 | Tonelli et al. |
| 5,831,610 A | 11/1998 | Tonelli et al. |
| 5,852,715 A | 12/1998 | Raz et al. |
| 5,873,096 A | 2/1999 | Lim et al. |
| 5,911,138 A * | 6/1999 | Li et al. |
| 5,918,159 A | 6/1999 | Fomukong et al. |
| 5,963,938 A * | 10/1999 | Wilson et al. |
| 5,963,953 A | 10/1999 | Cram et al. |
| 5,983,227 A | 11/1999 | Nazem et al. |
| 5,987,457 A * | 11/1999 | Ballard |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,189,016 B1 | 2/2001 | Cabrera et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,212 B1 | 6/2002 | Samu et al. |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,581,069 B1 | 6/2003 | Robinson et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,801,906 B1 | 10/2004 | Bates et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 * | 6/2010 | Weissman ............ 717/171 |
| 7,747,648 B1 | 6/2010 | Kraft et al. |
| 7,779,039 B2 * | 8/2010 | Weissman et al. ......... 707/793 |
| 7,779,475 B2 | 8/2010 | Jakobson et al. |
| 7,788,237 B2 | 8/2010 | Voronov et al. |
| 7,827,208 B2 | 11/2010 | Bosworth et al. |
| 7,831,609 B1 * | 11/2010 | Alexander ............ 707/765 |
| 7,851,004 B2 | 12/2010 | Hirao et al. |
| 7,853,881 B1 | 12/2010 | Assal et al. |
| 7,890,526 B1 * | 2/2011 | Brewer et al. ............ 707/767 |
| 7,945,653 B2 | 5/2011 | Zuckerberg et al. |
| 7,984,056 B1 | 7/2011 | Kane |
| 8,005,896 B2 | 8/2011 | Cheah |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,060,634 B1 | 11/2011 | Darnell et al. |
| 8,073,850 B1 | 12/2011 | Hubbard et al. |
| 8,082,301 B2 | 12/2011 | Ahlgren et al. |
| 8,095,413 B1 | 1/2012 | Beaven et al. |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Jakobson et al. |
| 8,209,333 B2 | 6/2012 | Hubbard et al. |
| 8,271,520 B1 * | 9/2012 | Aman et al. ............ 707/769 |
| 8,275,836 B2 | 9/2012 | Beaven et al. |
| 8,478,722 B2 | 7/2013 | Lee et al. |
| 8,484,111 B2 | 7/2013 | Frankland et al. |
| 8,490,025 B2 | 7/2013 | Jakobson et al. |
| 8,498,994 B2 | 7/2013 | Prabaker et al. |
| 8,504,945 B2 | 8/2013 | Jakobson et al. |
| 8,510,664 B2 | 8/2013 | Ruben et al. |
| 8,549,047 B2 | 10/2013 | Beechuk et al. |
| 8,566,301 B2 | 10/2013 | Ruben et al. |
| 8,646,103 B2 | 2/2014 | Jakobson et al. |
| 2001/0044791 A1 | 11/2001 | Richter et al. |
| 2002/0059407 A1 | 5/2002 | Davies |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0037263 A1 | 2/2003 | Kamat et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0126180 A1 | 7/2003 | Bogart et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |

(56) References Cited

U.S. PATENT DOCUMENTS

| | | |
|---|---|---|
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0139043 A1 | 7/2004 | Lei et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0015368 A1* | 1/2005 | Payton et al. ............... 707/4 |
| 2005/0050555 A1 | 3/2005 | Exley et al. |
| 2005/0091098 A1 | 4/2005 | Brodersen et al. |
| 2005/0091197 A1* | 4/2005 | Dettinger et al. ............ 707/3 |
| 2006/0106774 A1 | 5/2006 | Cohen et al. |
| 2006/0235831 A1 | 10/2006 | Adinolfi et al. |
| 2007/0061487 A1 | 3/2007 | Moore et al. |
| 2007/0106536 A1 | 5/2007 | Moore |
| 2008/0040474 A1 | 2/2008 | Zuckerberg et al. |
| 2008/0040673 A1 | 2/2008 | Zuckerberg et al. |
| 2008/0065701 A1 | 3/2008 | Lindstorm |
| 2008/0082540 A1 | 4/2008 | Weissman et al. |
| 2008/0195694 A1 | 8/2008 | Alaniz et al. |
| 2008/0243784 A1* | 10/2008 | Stading ........................ 707/3 |
| 2008/0249972 A1 | 10/2008 | Dillon |
| 2008/0281610 A1 | 11/2008 | Yoshida et al. |
| 2008/0301175 A1 | 12/2008 | Applebaum et al. |
| 2009/0063415 A1 | 3/2009 | Chatfield et al. |
| 2009/0070334 A1 | 3/2009 | Callahan et al. |
| 2009/0100342 A1 | 4/2009 | Jakobson |
| 2009/0222750 A1 | 9/2009 | Jain et al. |
| 2009/0249290 A1 | 10/2009 | Jenkins et al. |
| 2009/0254390 A1 | 10/2009 | Megiddo et al. |
| 2009/0260060 A1 | 10/2009 | Smith et al. |
| 2009/0282045 A1 | 11/2009 | Hsieh et al. |
| 2009/0292773 A1 | 11/2009 | Leedberg et al. |
| 2010/0049852 A1 | 2/2010 | Whitnah et al. |
| 2010/0132049 A1 | 5/2010 | Vernal et al. |
| 2010/0287256 A1 | 11/2010 | Neilio |
| 2011/0113057 A1 | 5/2011 | Lee et al. |
| 2011/0113058 A1 | 5/2011 | Lee et al. |
| 2011/0113059 A1 | 5/2011 | Lee et al. |
| 2011/0113071 A1 | 5/2011 | Lee et al. |
| 2011/0113072 A1 | 5/2011 | Lee et al. |
| 2011/0220876 A1* | 9/2011 | Nishizawa et al. ............ 257/30 |
| 2012/0004973 A1* | 1/2012 | Postrel ................. G06Q 20/387 705/14.27 |
| 2012/0233137 A1 | 9/2012 | Jakobson et al. |
| 2012/0290407 A1 | 11/2012 | Hubbard et al. |
| 2012/0296926 A1* | 11/2012 | Kalin ................... G06F 17/3097 707/765 |
| 2013/0218948 A1 | 8/2013 | Jakobson |
| 2013/0218949 A1 | 8/2013 | Jakobson |
| 2013/0218966 A1 | 8/2013 | Jakobson |
| 2014/0059069 A1* | 2/2014 | Taft et al. ...................... 707/765 |
| 2014/0359537 A1 | 12/2014 | Jackobson |
| 2015/0006289 A1 | 1/2015 | Jakobson |
| 2015/0007050 A1 | 1/2015 | Jakobson |
| 2015/0095162 A1 | 4/2015 | Jakobson |
| 2015/0172563 A1 | 6/2015 | Jakobson |

OTHER PUBLICATIONS

Google Plus Users, Google+Ripples, Oct. 31, 2011 [retrieved on Feb. 21, 2012 from Internet at http://www.googleplusers.com/google-ripples.html], 3 pages.

* cited by examiner

Filters [REMOVE ▼]

Show [ALL WORK ▼]

Date Field [ASSIGNED ON ▼] Range [ALL TIME ▼] From [____] 📅 To [____] 📅

Filter Logic: [(1 AND 3 AND 5) AND (4) AND (2 OR 6) ...]
*Error: The filter logic references an undefined filter: 6.*

1. Scheduled Build starts with "174.172"
2. Type equals "Bug, Test Failure, Feature Request, Test Change"
3. Team contains "Analytics"                                104b
4. Status does not contain "Duplicate, Never, Not a bug" ◂╯
5. Type of Record contains "User Story"

```
Filters [REMOVE ▼]
    Show [ALL WORK ▼]
Date Field [ASSIGNED ON ▼]  Range [ALL TIME ▼] From [    🗓] To [    🗓]

Filter Logic: [ (1 AND 3 AND 5) AND (4) AND (2 OR 6) ... ]
502a ─▶ Error: The filter logic references an undefined condition: 3.   440

1. Scheduled Build starts with "174.172"
434a  2. Type equals "Bug, Test Failure, Feature Request, Test Change"
       ╲─3. Team contains "Analytics"                                     ⎫
         4. Assigned To equals "Joe Smith"   432a                         ⎬─430
434b  5. Status does not contain "Duplicate, Never, Not a bug"            ⎪
       ╲─6. Type of Record contains "User Story"                          ⎭
                                             432b                        (BUILD)
```

500a ─▶ *FIGURE 5A*

```
Filters [REMOVE ▼]
    Show [ALL WORK ▼]
Date Field [ASSIGNED ON ▼]  Range [ALL TIME ▼] From [    🗓] To [    🗓]

Filter Logic: [ (1 AND 3 AND 5) AND (4) AND (2 OR 6) ... ]
                                                                          440

1. Scheduled Build starts with "174.172"
  2. Type equals "Bug, Test Failure, Feature Request, Test Change"
  3. Team contains "Analytics"
  4. Assigned To equals "Joe Smith"
  5. Status does not contain "Duplicate, Never, Not a bug"        (BUILD)
  6. Type of Record contains "User Story"
```

500b ─▶ *FIGURE 5B*

Filters [REMOVE] [▼]

Show [ALL WORK] [▼]

Date Field [ASSIGNED ON] [▼] Range [ALL TIME] [▼] From [____] [📅] To [____] [📅]

Filter Logic: [ (1 AND 3 AND 5) AND (4) AND (2 OR 6) ... ] (DELETE?) (EDIT?) (SKIP?)

1. Scheduled Build starts with "174.172"
2. Type equals "Bug, Test Failure, Feature Request, Test Change"
3. ~~Team contains "Analytics"~~
4. Assigned To equals "Joe Smith"
5. Status does not contain "Duplicate, Never, Not a bug"
6. Type of Record contains "User Story"

(BUILD)

Filters [REMOVE] [▼]

Show [ALL WORK] [▼]

Date Field [ASSIGNED ON] [▼] Range [ALL TIME] [▼] From [____] [📅] To [____] [📅]

Filter Logic: (1 AND 4) AND (3) AND (2 OR 5) ...
440'

1. Scheduled Build starts with "174.172"
2. Type equals "Bug, Test Failure, Feature Request, Test Change"
3. Assigned To equals "Joe Smith"
434c  4. Status does not contain "Duplicate, Never, Not a bug"
5. Type of Record contains "User Story"

METHOD AND SYSTEM FOR UPDATING A FILTER LOGIC EXPRESSION REPRESENTING A BOOLEAN FILTER

CLAIM OF PRIORITY

This application claims the benefit of U.S. Provisional Patent Application No. 61/545,252 entitled, METHODS AND SYSTEMS TO ELIMINATE COMPONENTS FROM BOOLEAN FILTER, filed Oct. 10, 2011 the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to an automated process for updating a filter logic expression representing a Boolean filter when a filter search condition is removed.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Typical data storage systems are configured to store and manage data objects such as files, documents, records and the like. Such systems support search services that allow a user to search for and to retrieve data objects from the system. The user typically creates Boolean filters to facilitate a search process by combining search terms using simple logical operators. For example, a simple Boolean filter "tropical AND island" can be used to retrieve files that contain both terms "tropical" and "island," while another simple Boolean filter "tropical NOT island" can be used to retrieve files that contain the term "tropical," but not "island." Boolean filters can also be paired with file properties, such as a file's author, date created, date updated, etc.

For more complex searches, instead of search terms, the Boolean filter can combine search conditions using logical operators. The search conditions themselves can be filters, and are typically configured by users skilled in database management and/or computer programming. For example, a complex filter can be represented by the following expression:

(Status does not contain "Duplicate, Never, Not a bug")AND(Type of Record contains "User Story")AND(Assigned To equals(("Joe" OR "Jane")AND "Smith"))

This type of expression is typically referred to as a filter logic expression. To simplify this expression, each search condition can be associated with an identifier, such as a number and/or an alphabetical letter, and the filter logic expression can be rewritten using identifiers and logical operators.

Some search services can be configured to provide an interface that allows the user to create a Boolean filter to retrieve data objects from a storage system. For example, FIG. 1A illustrates a standard user interface 100a that can be used to create a simplified filter logic expression 110 that represents a complex Boolean filter. The user interface 100a can include a condition list 102 that lists several search conditions 104 defined by the user or a file system administrator. Each search condition 104 is associated with an identifier 106, and the search conditions 104 are listed in sequential order by their respective identifiers 106. In this example, the identifiers 106 are numbers and the search conditions 104 are listed in ascending numerical order. The user interface 100a also includes the filter logic expression 110 expressed in terms of the identifiers 106 associated with the search conditions 104, as opposed to the search conditions themselves. Accordingly, in a single interface, the user can view the search conditions 104 and the simplified filter logic expression 110 that represents the complex Boolean filter.

Typically, the file system administrator or the user is allowed to add or remove search conditions 104 from the condition list 102. For example, when the file system is updated such that a particular search condition 104 becomes obsolete or inapplicable, or when it is determined that a certain search condition 104 should not be used, the obsolete or restricted search condition 104 must be removed from the list 102 so that when a new filter logic expression 110 is created, the new expression does not contain the obsolete or restricted search condition 104. In these situations, search services can be configured to allow the file system administrator or the user to add or remove search conditions 104 from the condition list 102. For example, in FIG. 1B, a standard user interface 100b that can be used to remove a search condition 104a associated with the identifier "4" is illustrated. In this case, the search condition, "Assigned To equals 'Joe Smith,'" can be removed when "Joe Smith" is no longer employed by a company and data objects assigned to "Joe Smith" are reassigned to another employee.

When the removal is implemented, e.g., by selecting the "next" button, the search service automatically removes the search condition 104a from the condition list 102. Moreover, for each search condition subsequent to the removed search condition 104a, the search service can modify the identifier 106 associated with each subsequent search condition 104b, 104c so that the sequential order of the list 102 is preserved. For example, in FIG. 1B, the search conditions 104b, 104c subsequent to the removed search condition 104a are associated with the identifiers "5" and "6" respectively. When the removal is implemented, the search service can reassociate the subsequent search conditions 104b, 104c with the identifiers "4" and "5" respectively, so that the sequential order of the condition list 102 is preserved and gaps in the ordering are not present. FIG. 1C illustrates an interface 100c that can be displayed after the removal is implemented.

The removal of a search condition 104a, while simple and easily implemented, can affect filter logic expressions 106 created prior to the removal of the search condition 104a. For example, in FIG. 1C, the filter logic expression 106 that was applicable in FIG. 1A and FIG. 1B is no longer valid because it refers to an identifier, e.g., "6," that is no longer associated with a search condition. Moreover, some of the identifiers in the expression 106 are now associated with different search conditions. For example, prior to the removal of the search condition 104a, the search condition 104b, e.g., "Status does not contain 'Duplicate, Never, Not a bug,'" is associated with the identifier "5" in FIG. 1B; whereas after the removal, the same search condition 104b is now associated with identifier "4" in FIG. 1C. Because of this modification, the Boolean filter represented by the filter logic expression 106 in FIG. 1C is completely different from the Boolean filter represented by the filter logic expression 106 in FIG. 1B, and no longer represents the data object for which the user is searching.

Thus, when a search condition 104 is removed from the condition list 102, the user must closely examine the filter logic expression 106 to delete any reference to the removed search condition 104a and must manually correct any reference errors and/or syntax errors resulting from the removal. Moreover, the user must determine whether the remaining identifiers in the expression 106 refer to the appropriate search conditions 104 and if not, the user must manually update the identifier(s) in the filter logic expression 106 to ensure that the appropriate data objects are retrieved. This process can be tedious and error prone, particularly when the filter logic expression 106 comprises a long string of search conditions 104.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 1A, 1B and 1C illustrate representative standard user interfaces for managing a Boolean filter;

FIGS. 5A-5D illustrate exemplary interfaces for automatically updating a filter logic expression representing a Boolean filter according to an embodiment;

DETAILED DESCRIPTION

General Overview

Systems and methods are provided for automatically updating a filter logic expression representing a Boolean filter, and in particular for updating the filter logic expression automatically when a search condition is removed. According to exemplary embodiments, a filter manager component is provided and configured to generate and manage filter logic expressions representing complex Boolean filters. The filter manager component can, in an embodiment, provide a condition list comprising a plurality of search conditions which can be used to build the filter logic expressions. In an embodiment, each search condition is associated with an identifier, and the search conditions are listed in sequential order according to their associated identifiers. In an embodiment, when a search condition is removed from the list, e.g., because it is obsolete or is no longer needed, the filter manager component can automatically reassociate at least one of the remaining search conditions with a new identifier due to the removal of the obsolete search condition such that the sequential order of the list is preserved. When a search condition is reassociated with a new identifier, the filter manager component automatically modifies a filter logic expression based on the new identifier thereby relieving the user of this important, but tedious and error prone, task.

Figure 2:
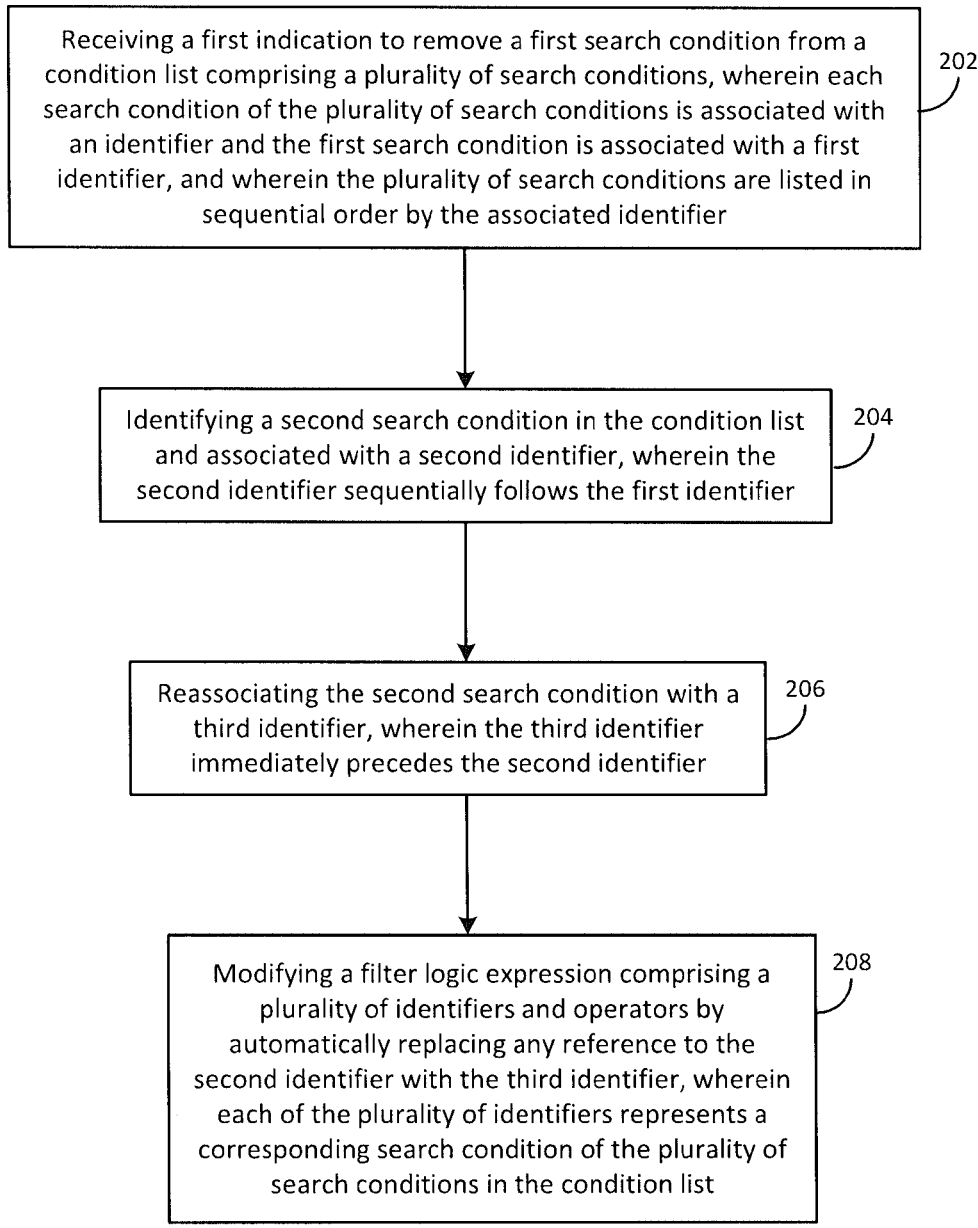
FIG. 2 is an operational flow diagram illustrating a high level overview of a technique for automatically updating a updating a filter logic expression representing a Boolean filter according to an embodiment.
Figure 4A:
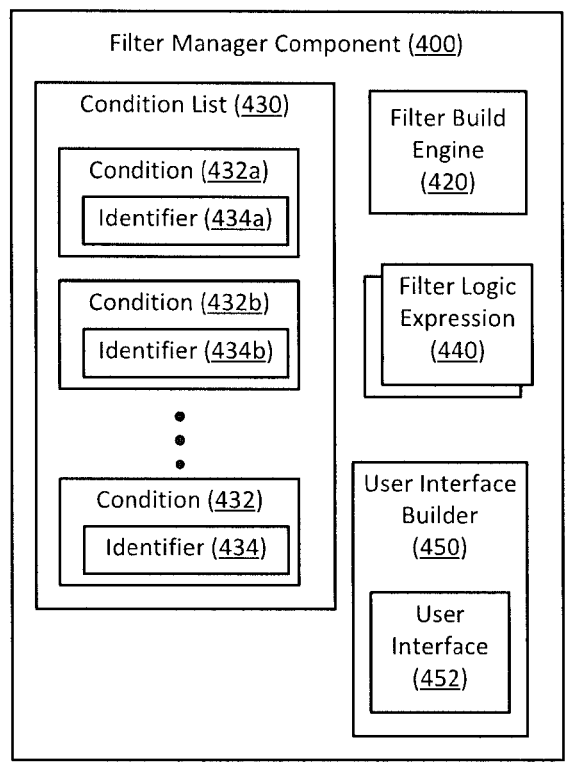
FIG. 4A is a block diagram representing an exemplary system for automatically updating a filter logic expression representing a Boolean filter according to an embodiment.
Figure 4B:
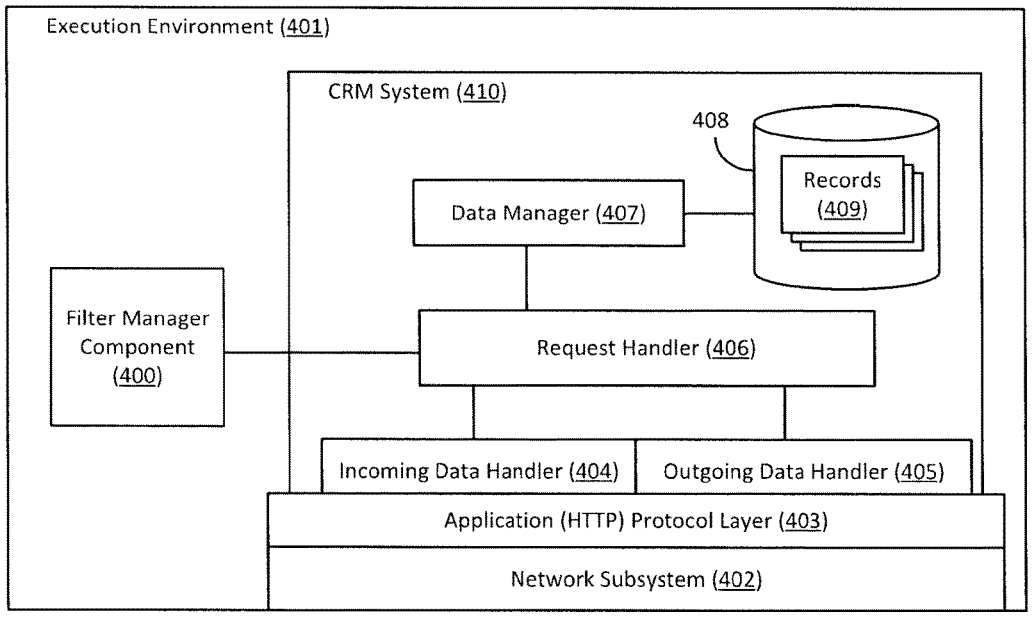
FIG. 4B is a block diagram representing another exemplary system for automatically updating a filter logic expression representing a Boolean filter according to another embodiment.
Figure 4C:
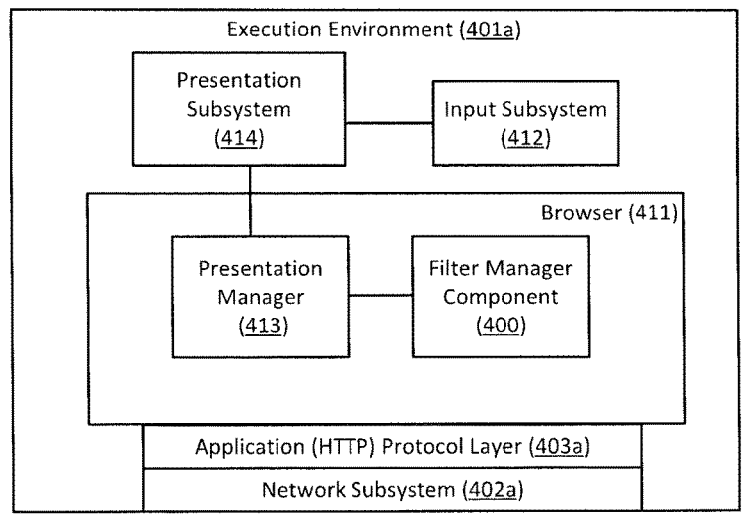
FIG. 4C is a block diagram representing another exemplary system for automatically updating a filter logic expression representing a Boolean filter according to yet another embodiment.

Referring now to FIG. 2, a flow diagram is presented illustrating a method 200 for automatically updating a filter logic expression representing a Boolean filter according to an embodiment. FIG. 4A illustrates a representative system 400 for automatically updating a filter logic expression representing a Boolean filter according to an embodiment, and FIGS. 4B and 4C are block diagrams illustrating additional exemplary systems for automatically updating a filter logic expression according to exemplary embodiments. In particular, FIG. 4A illustrates an arrangement of components configured to implement the method 200 of FIG. 2, which also can be carried out in environments other than that illustrated in FIG. 4A.

Figure 3:
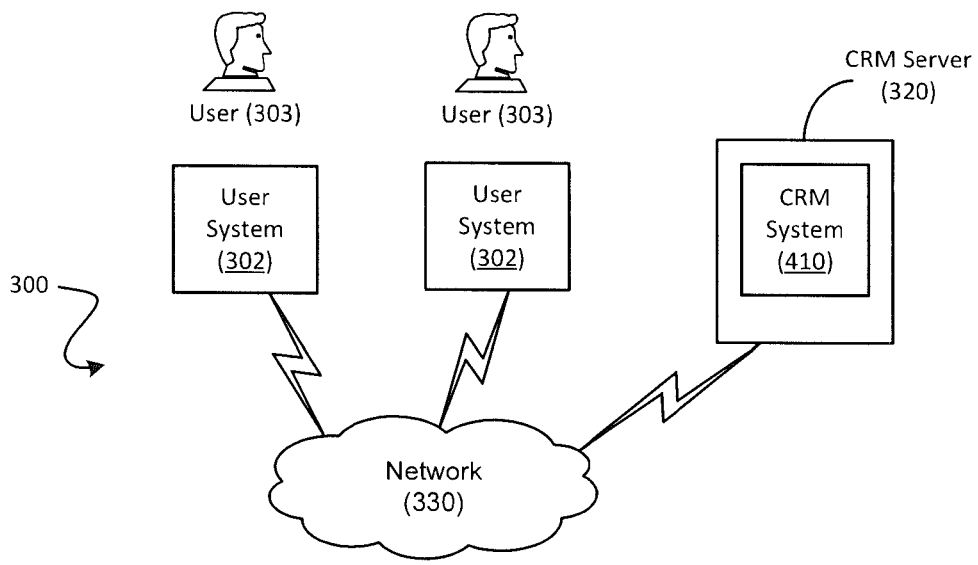
FIG. 3 illustrates a network in which a system for automatically updating a filter logic expression representing a Boolean filter according to an embodiment.

The components illustrated in FIG. 4A are configured to operate within an execution environment hosted by a physical or virtual computer node and/or multiple computer nodes, as in a distributed execution environment. Exemplary computer nodes can include physical or virtual desktop computers, servers, networking devices, notebook computers, PDAs, mobile phones, digital image capture devices, and the like. For example, FIG. 3 illustrates a plurality of user system computer nodes 302 and an application server node 320 communicatively coupled to one another via a network 330, such as the Internet. In an embodiment, the application server node 320 and/or the user system node 302 can be configured to provide an execution environment configured to support the operation of the components illustrated in FIG. 4A and/or their analogs. As is shown, the application server node 320 can also host a customer relationship management ("CRM") system 410. One example of an application server node 320 will be described later in greater detail during reference to later illustrated embodiments.

In an embodiment illustrated in FIG. 4B, the CRM system 410 includes components adapted for operating in an execution environment 401. The execution environment 401, or an analog, can be provided by a node such as the application server node 320. The CRM system 410 can include an incoming 404 and outgoing 405 data handler component for receiving and transmitting information from and to the plurality of user system nodes 302 via the network 330. In addition, the CRM system 410 can include a data store 408 for storing data records 409 relating to customer relationships and other business information. In an embodiment, the data store 408 can be a database system located in a cloud computing environment, and may be implemented as a multi-tenant on-demand database system. As used herein, the term multi-tenant database system refers to those systems in which various elements of hardware and software of the database system may be shared by one or more customers. For example, a given application server 320 may simultaneously process requests for a great number of customers, and a given database table may store rows for multiple customers.

In an embodiment, the CRM system 410 can be configured to receive information from the user system nodes 302, to store the information, e.g., in the records 409, and to retrieve and provide such information to the user system nodes 302 via the network 330. The network 330 can be a local area network (LAN) or a wide area network (WAN), such as the Internet.

According to an embodiment illustrated in FIG. 4C, each user system node 302 can represent a virtual or physical computer device through which a user 303 can communicate with other users 303 and with the application server 320 via the network 330. The user system node 302 can provide an execution environment 401a within which components are adapted for operating. For example, each user system node 302 may include an application that allows network communication between the user system 302 and CRM system 410 hosted by the application server 320. Such an application can be, in an embodiment, a web portal (not shown) provided by a network browser 411 (e.g., Chrome, Internet Explorer, Safari, etc.) or the like that is capable of sending and receiving information to and from the application server 320.

With reference to FIG. 2, the method 200 begins, in block 202, by receiving a first indication to remove a first search condition from a condition list comprising a plurality of search conditions. In an embodiment, each search condition is associated with an identifier and the first search condition is associated with a first identifier, and the plurality of search conditions are listed in sequential order based on the associated identifier. FIG. 4A illustrates a filter manager component 400 that includes a filter build engine 420 configured to receive a first indication to remove a first search condition 432a associated with a first identifier 434a from a condition list 430 having a plurality of search conditions 432.

According to an embodiment, the filter manager component 400 can be configured to manage the condition list 430 and the search conditions 432 listed therein. For example, the filter build engine 420 can be configured, in an embodiment, to receive a new search condition 432 from the user 303 and to associate the new search condition 432 with an identifier 434. In an embodiment, the search conditions 432 are listed in sequential order in the condition list 430. Accordingly, the identifier 434 associated with the new search condition 432 will be a next identifier 434 in the sequence. For example, when the identifier 434 is a number, the plurality of search conditions 432 are listed in numerical order and the next identifier 434 for the new search condition 432 will be the number immediately following the last number, and also will be the largest number/identifier 434 on the list 430. Alternatively, the identifier 434 can be an alphabetical letter and the search conditions 432 can be listed in alphabetical order, and the next identifier 434 for the new search condition 432 can be the letter immediately following the last letter. Other sequential schemes can exist and can be described, and therefore, the identifiers 434 are not limited to numbers and/or letters alone or in combination.

In addition, the filter manager component 400 can be configured to manage at least one filter logic expression 440 configured by the user 303 using the search conditions 432 listed in the condition list 430. According to an embodiment, search conditions 432 and/or filter logic expressions 440 can be generated by the user 303 and provided to the filter manager component 400 via the user's user system 302. For example, in the browser 411, the filter manager component 430 can receive the search condition 432 and/or the filter logic expression 440 via a presentation manager 413 of the browser 411. The presentation manager 413 can be configured to interoperate with a presentation subsystem 414 in the execution environment 401a to present a graphical user interface (GUI) for the browser 411. In an embodiment, the filter manager component 400 can include a user interface builder component 450 that is configured to provide a template for creating a search condition 432 and/or filter logic expression 440, which can then be rendered by the presentation manager 413 for display to the user 303 by the presentation subsystem 414. Input, such as user input, can be received from an input device (not shown) by an input subsystem 412 of the execution environment 401a.

Alternatively, in the server 320, the filter manager component 400 can receive search conditions 432 and/or filter logic expressions 440 from the user 303 via a request handler component 406 in the CRM system 410. According to an embodiment, when a request to create a search condition 432 and/or filter logic expression 440 is received from a user 303 via the network 330, the filter manager component 400 can present the template to the user 303 via the user's user system 302. When the required information is entered into the template, a message including the completed template can be transmitted to the filter manager component 400 in the server 320. According to an embodiment, the filter manager component 400 can be configured to receive the message from the user system 302 over the network 330 via a network subsystem 402 and an application protocol layer, or other higher protocol layer, as illustrated by an exemplary HTTP protocol layer 403, among many possible standard and proprietary protocol layers. These higher protocol layers can encode, package, and/or reformat data for sending and receiving messages over a network layer, such as Internet Protocol (IP), and/or a transport layer, such as Transmission Control Protocol (TCP) and/or User Datagram Protocol (UDP). The request handler component 406 in the CRM system 410 can be configured to receive the information via the incoming data handler 404 and to route the template information to the filter manager component 400.

Figures 1A, 1B:

As stated above, the filter build engine 420 in the filter manager component 400 can receive the template information and can be configured, in an embodiment, to associate the new search condition 432 with an identifier 434 and to update the condition list 430 with the new search condition 432. Alternatively, the filter build engine 420 can store the new filter logic expression 440. According to an embodiment, the user interface builder component 450 can be configured to provide a user interface 452 that includes the condition list 430 and the search conditions 432, such as that illustrated in FIG. 1A.

As stated above, the filter build engine 420 is configured to receive the first indication to remove a first search condition 432a associated with a first identifier 434a from the condition list 430 having a plurality of search conditions 432. According to an embodiment, when the indication is received, the filter build engine 420 can be configured to direct the user interface builder component 450 to update an appearance of the condition list 430 included in the user interface 452 to indicate an impending removal of the first search condition 432a. For example, FIG. 5A illustrates an exemplary user interface 500a that indicates the impending removal of a search condition 432a corresponding to "Team contains 'Analytics.'" In this embodiment, the appearance of the condition list 430 is updated by striking out the search condition 432a. In other embodiments, the appearance of the condition list 430 can be updated in other ways to indicate the impending removal of the search condition 432a, such as by highlighting the search condition 432a, inserting brackets around the search condition 432a, and/or modifying the appearance of the search condition 432a. In each embodiment, the search condition 432a appears in the condition list 430, albeit in an altered state, so that the user 303 can see which of the plurality of search conditions 432 will be removed.

According to an embodiment, the filter build engine 420 can also be configured to analyze the filter logic expression 440 to detect whether the removal of the search condition 432a will cause a syntax error in the filter logic expression 440. When such an error is detected, the filter build engine 420 can be configured to direct the user interface builder component 450 to display an error message 502a that describes the detected syntax error. For example, in FIG. 5A, the removed condition 432a is associated with an identifier 434a "3." Because the filter logic expression 440 includes a reference to the identifier 434a associated with the removed search condition 432a, the error message 502a states, "The filter logic references an undefined search condition: 3." In this manner, the user 303 can be warned of potential errors, and the user 303 can take corrective action prior to implementing the removal of the search condition 432a.

In an embodiment, in response to the error warning, the user 303 can edit the filter logic expression 440 so that the detected error is remediated. For example, the user 303 can find and delete a reference to the identifier 434a associated with the removed condition 432a by striking out the identifier 434a and any operators associated with the identifier 434a in the filter logic expression 440, as is shown in FIG. 5B. In an embodiment, as the user 303 performs this function, the filter build engine 420 can be configured to analyze the user's proposed deletion(s) and to determine whether syntax errors will result from such actions. When a potential error is detected, the filter build engine 420 can be configured to provide a warning (not shown) so that the user 303 can review his selections and proactively remediate the error.

Alternatively or in addition, in another embodiment, the filter build engine 420 can scan the filter logic expression 440 to automatically detect the reference(s) to the identifier 434a, and then can direct the user interface builder component 450 to modify an appearance of the detected reference(s) in the filter logic expression 440 included in the user interface 452. For example, in FIG. 5C, the appearance of the identifier 434a associated with the removed condition 432a and the operator associated with the identifier 434a can be shaded, and the user 303 can be asked whether the shaded information should be deleted, edited, or skipped. When the user 303 selects the "edit" button, the user 303 can be allowed to modify the shaded region in the filter logic expression 440 so that the user 303 can indicate what information should be deleted. Whereas, when the user 303 selects the "skip" button, the filter build engine 420 can scan the filter logic expression 440 for the next reference to the identifier 434a.

According to an embodiment, when the user 303 is ready, the user 303 can transmit an indication to delete the identifier 434a and any operators associated with the identifier 434a in the filter logic expression 440 to the filter build engine 420. For example, in FIG. 5B and FIG. 5C, the indication to delete the information relating to the identifier 434a can be transmitted when the user 303 selects the "build" button. In an embodiment, the filter build engine 420 can be configured to receive the indication to delete from the filter logic expression 440 the information relating to the identifier 434a from the user system 302 via the network 330. Alternatively or in addition, the indication to delete the information from the filter logic expression 440 can be received via the input subsystem 412 and the presentation subsystem 414. In either or both cases, the filter build engine 420 can be configured to delete from the filter logic expression 440 the information relating to the identifier 434a associated with the removed search condition 432a in response to receiving the indication.

Referring again to FIG. 2, when the first indication to remove the first search condition 432a is received, a second search condition associated with a second identifier that sequentially follows the first identifier can be identified in block 204. According to an embodiment, the filter build engine 420 can be configured to identify the second search condition, e.g., 432b, associated with a second identifier 434b that sequentially follows the first identifier 434a. Once identified, the second search condition 432b can be reassociated with a third identifier that immediately precedes the second identifier 434b in block 206.

According to an embodiment, when the indication to remove a search condition 423a is received and implemented, the filter build engine 420 can be configured to remove the search condition 432a from the condition list 430. As noted above, when a search condition 432a is removed from the condition list 430, the identifiers 434 of the search conditions 432 following the removed condition 432a will change in order to preserve the sequential order of the identifiers 434 in the condition list 430. Thus, for example, in FIG. 5A, when the search condition 432a associated with the first identifier ("3") 434a is removed, the filter build engine 420 can automatically identify the search condition "Type of Record contains 'User Story' as a search condition 432b that is associated with a second identifier ("6") 434b that sequentially follows the first identifier 434a. The filter build engine 420 can then reassociate the search condition 432b with a new identifier 432c, e.g., "5," which is the identifier that immediately precedes the previous identifier 434b to preserve the sequential order of the condition list 430. In an embodiment, once the search condition 432b is reassociated with the new identifier 434c, the filter build engine 420 can direct the user interface builder component 450 to update appearance of the condition list 430 included in the user interface 452, as is shown in FIG. 5D.

Referring again to FIG. 2, when a second search condition 432b associated with a second identifier 434b is reassociated with a third identifier 434c, the filter logic expression 440 can be automatically modified by replacing any reference to the second identifier 434b with the third identifier 434c in block 208. According to an embodiment, the filter build engine 420 is configured to automatically modify the filter logic expression 440 in this manner.

In an embodiment, the filter build engine 420 can be configured to analyze each identifier 434 in the filter logic expression 440 to determine whether the identifier 434 sequentially follows the first identifier 434a associated with the removed search condition 432a. When the identifier 434 does not sequentially follow the first identifier 434a, the filter build engine 420 can disregard the identifier 434. On the other hand, when the identifier 434b does sequentially follow the first identifier 434a, the filter build engine 420 can automatically replace the identifier 434b with the identifier 434c that immediately precedes it. According to an embodiment, the filter build engine 420 can modify the filter logic expression 440 after the filter build engine 420 has deleted from the filter logic expression 440 the information relating to the identifier 434a associated with the removed search condition 432a.

When the information relating to first identifier 434a is deleted and each of the identifiers 434 in the filter logic expression 440 has been analyzed and replaced if necessary, the filter build engine 420 can, in an embodiment, direct the user interface builder component 450 to update the user interface 452 to reflect the removal of the search condition 432a. For example, FIG. 5D illustrates an exemplary user interface 500d that includes the modified filter logic expression 440' that does not include references to the removed search condition 432a and that includes identifiers 434 associated with the appropriate search conditions 432. Moreover, the user interface 500d includes an updated condition list 430' that does not have the removed search condition 432a.

According to exemplary embodiments, when an indication to remove a search condition 432 from a condition list 430 is received from the user 303, the filter manager component 440 provides a user interface 452 that includes the projected changes to the condition list 430 so that the user 303 can see which search condition 432a is being removed and what impact the removal might have on the filter logic expression 440. The user interface 452 also allows the user 303 to visually identify what information relating to the removed search condition 432a should be deleted from the filter logic expression 440. When the user 303 submits the deletions, the filter manager component 440 automatically removes the search condition 432a from the condition list 430 and deletes the information identified by the user 303 from the filter logic expression 440. In addition, the filter manager component 440 automatically updates the remaining identifiers 434 in the filter logic expression 440 so that the remaining identifiers 434 are associated with the proper search conditions 432.

According to aspects of the exemplary embodiments, the user 303 can be guided by the filter manager component 440 to delete references to the removed search condition 432a and the user 303 is no longer required to manually update the remaining identifier(s) 434 in the filter logic expression 440 to ensure that the appropriate data objects are retrieved. Thus, in an embodiment, the user 303 can be confident that the Boolean filter represented by the modified filter logic expression 440' will return the appropriate information when it is submitted to a database service, such as the CRM system 410.

System Overview

Figure 6:
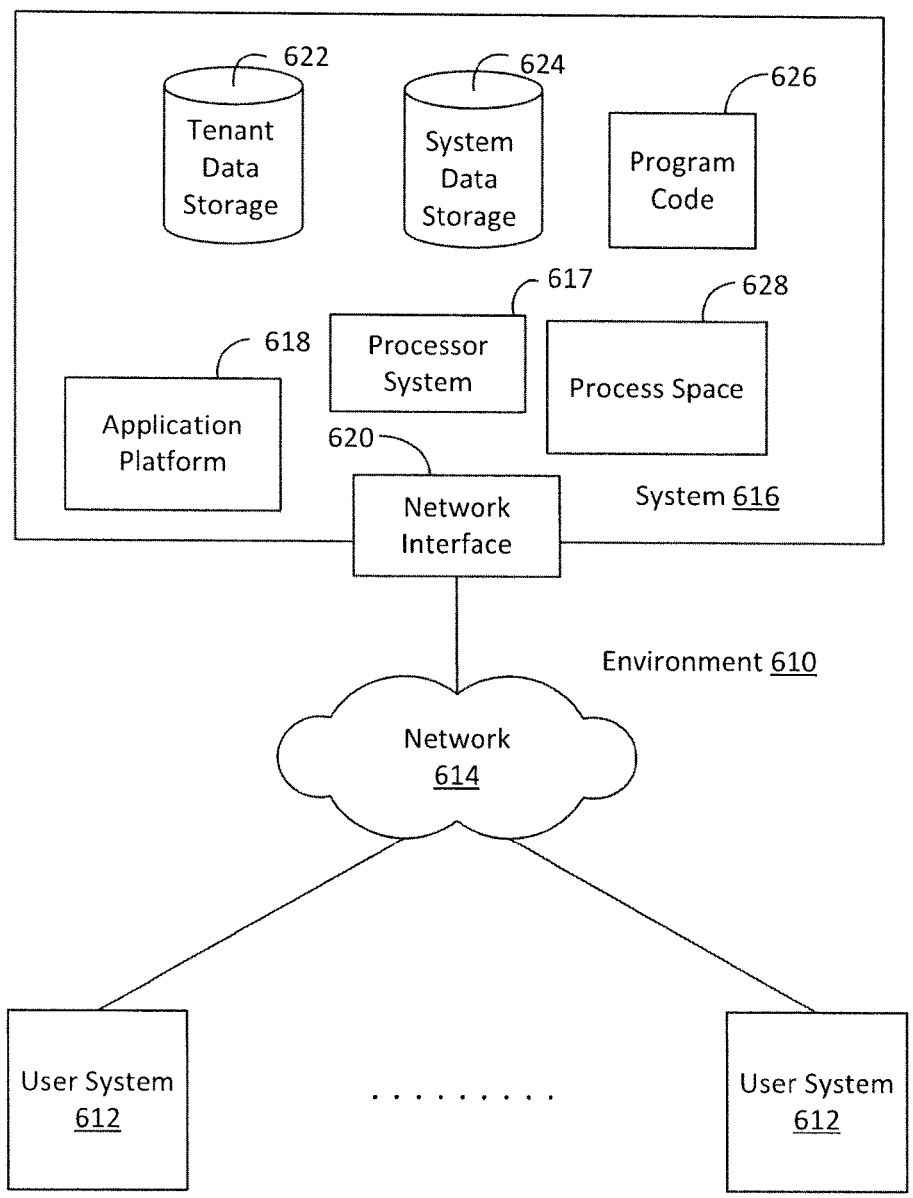
FIG. 6 illustrates a block diagram of an example of an environment where an on-demand database service might be used.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
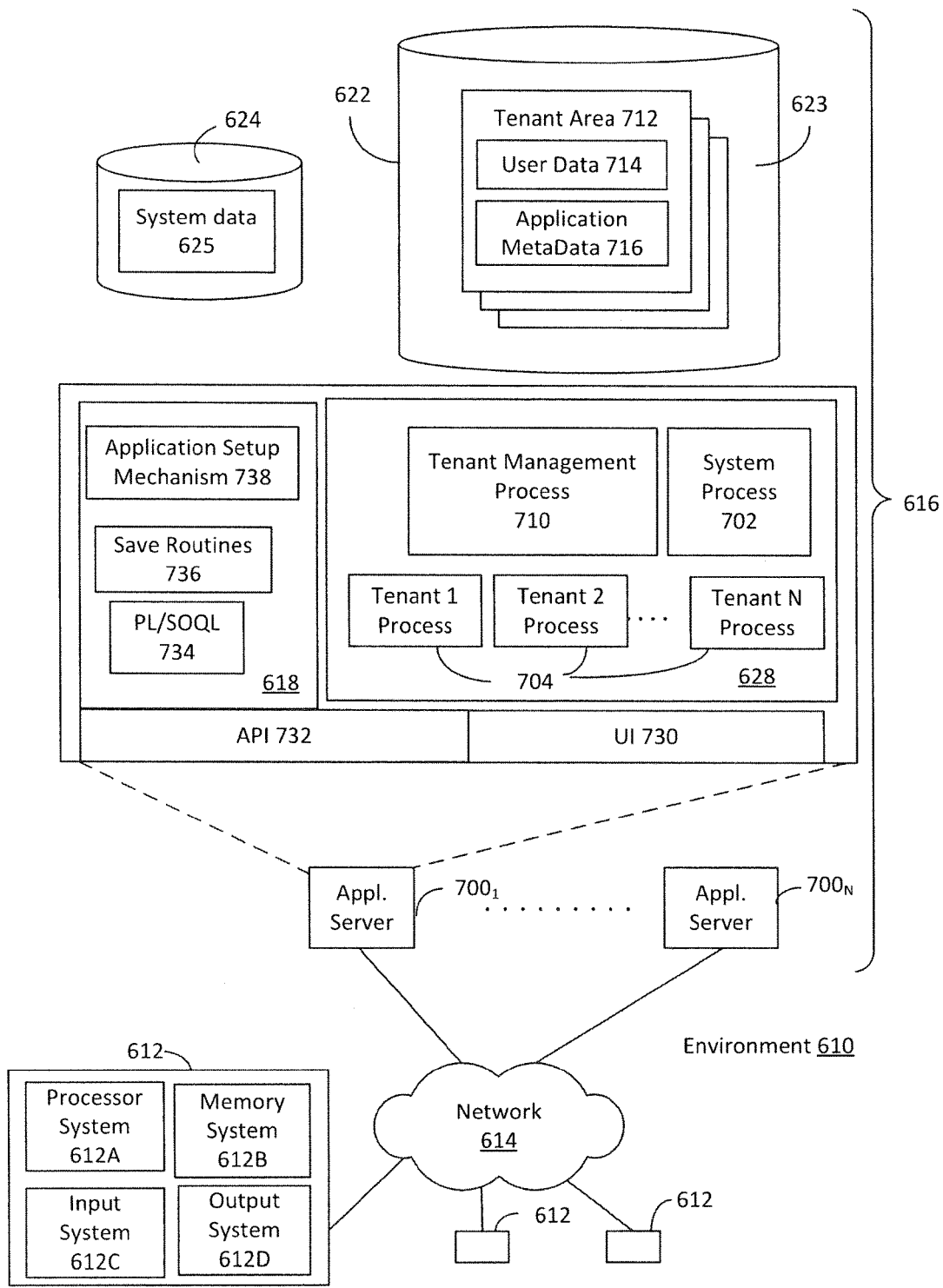
FIG. 7 illustrates a block diagram of an embodiment of elements of FIG. 6 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user data storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers $700_1$-$700_N$, an application platform 618, tenant data storage 622, and system data storage 624. Also shown is system process space 702, including individual tenant process spaces 704 and a tenant management process space 710. Each application server $700_1$-$700_N$ may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user data storage 714 and application metadata 716 might be similarly allocated for each user. For example, a copy of a user's most recently used (MRU) items might be stored to user data storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612.

The tenant data 623 and the system data 625 may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sept. 21, 2007, which is hereby incorporated by reference in its entirety and for all purposes. Invocations to applications may be detected by one or more system processes, which manages retrieving application metadata 716 for the subscriber making the invocation and executing the metadata as an application in a virtual machine.

Each application server $700_1$-$700_N$ may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers $700_1$-$700_N$ and the database system. However, it will be apparent to one skilled in the art that other transport protocols may be used to optimize the system depending on the network interconnect used.

In certain embodiments, each application server $700_1$-$700_N$ is configured to handle requests for any user associated with any organization that is a tenant. Because it is desirable to be able to add and remove application servers from the server pool at any time for any reason, there is preferably no server affinity for a user and/or organization to a specific application server $700_1$-$700_N$. In one embodiment, therefore, an interface system implementing a load balancing function (e.g., an F5 Big-IP load balancer) is communicably coupled between the application servers $700_1$-$700_N$ and the user systems 612 to distribute requests to the application servers $700_1$-$700_N$. In one embodiment, the load balancer uses a least connections algorithm to route user requests to the application servers $700_1$-$700_N$. Other examples of load balancing algorithms, such as round robin and observed response time, also can be used. For example, in certain embodiments, three consecutive requests from the same user could hit three different application servers $700_1$-$700_N$, and three requests from different users could hit the same application server $700_1$-$700_N$. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers $700_1$-$700_N$ to request and update system-level and tenant-level data from system 616 that may require sending one or more queries to tenant data storage 622 and/or system data storage 624. System 616 (e.g., an application server $700_1$ in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations and techniques have been described with reference to an embodiment in which techniques for providing machine status information in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method comprising:
providing, by a computer node, a filter logic expression comprising a plurality of search conditions separated by one or more Boolean operators, each of the plurality of search conditions being represented in the filter logic expression by an associated identifier;
providing, by the computer node, a list of the plurality of search conditions with their associated identifiers, the plurality of search conditions being displayed in sequential order based upon the identifiers;
identifying, by the node computer, a first search condition from the list of the plurality of search conditions in response to receiving a first indication to remove the first search condition from the list of the plurality of search conditions;
identifying, by the computer node, a second search condition of the plurality of search conditions associated with a second identifier, wherein the second identifier sequentially follows the first identifier;
reassociating, by the computer node, the second search condition with the first identifier in response to removing the first search condition from the list of the plurality of search conditions; and modifying, by the computer node, the filter logic expression by automatically replacing any reference to the second identifier with the first identifier.

2. The method of claim 1 wherein each identifier is a number, and wherein the plurality of search conditions are displayed in numerical order according to the associated identifiers.

3. The method of claim 1 wherein each identifier is an alphabetical letter, and wherein the plurality of search conditions are displayed in alphabetical order according to the associated identifiers.

4. The method of claim 1 further comprising providing a user interface including a condition list and the plurality of search conditions.

5. The method of claim 4 wherein in response to receiving the first indication, the method further includes updating an appearance of the condition list included in the interface to indicate an impending removal of the first search condition.

6. The method of claim 5 wherein updating the appearance of the condition list comprises at least one of striking out the first search condition, highlighting the first search condition, bracketing the first search condition, and modifying the appearance of the first search condition.

7. The method of claim 1 further comprising:
receiving a second indication to delete from the filter logic expression information relating to the first identifier; and
deleting from the filter logic expression the information relating to the first identifier in response to receiving the second indication.

8. The method of claim 7 wherein prior to receiving the second indication, the method further comprises:
providing a user interface for displaying the filter logic expression;
scanning the filter logic expression to detect a reference to the first identifier; and
modifying an appearance of the detected reference to the first identifier in the filter logic expression.

9. The method of claim 8 wherein, in response to receiving the second indication, the method further includes updating the filter logic expression displayed by the user interface to indicate the deletion of the information relating to first identifier.

10. The method of claim 7 wherein the information relating to the first identifier includes at least one of the first identifier and an operator associated with the first identifier.

11. An apparatus comprising:
a processor; and
one or more stored sequences of instructions which, when executed by the processor, cause the processor to carry out the steps of:
providing a filter logic expression comprising a plurality of search conditions separated by one or more Boolean operators, each of the plurality of search conditions being represented in the filter logic expression by an associated identifier;
providing a list of the plurality of search conditions with their associated identifiers, the plurality of search conditions being displayed in sequential order based upon the identifiers;
identifying a first search condition from the list of the plurality of search conditions in response to receiving a first indication to remove the first search condition from the list of the plurality of search conditions;

identifying a second search condition of the plurality of search conditions associated with a second identifier, wherein the second identifier sequentially follows the first identifier;
reassociating the second search condition with the first identifier in response to removing the first search condition from the list of the plurality of search conditions; and
modifying the filter logic expression by automatically replacing any reference to the second identifier with the first identifier.

12. The apparatus of claim 11 wherein each identifier is a number, and wherein the plurality of search conditions are displayed in numerical order according to the associated identifiers.

13. The apparatus of claim 11 wherein each identifier is an alphabetical letter, and wherein the plurality of search conditions are displayed in alphabetical order according to the associated identifiers.

14. The apparatus of claim 11 further comprising instructions which, when executed by the processor, cause the processor to carry out the step of providing a user interface including a condition list and the plurality of search conditions.

15. The apparatus of claim 14 further comprises instructions which, when executed by the processor, cause the processor to carry out the steps of updating, in response to receiving the first indication, an appearance of the condition list included in the interface to indicate an impending removal of the first search condition.

16. The apparatus of claim 15 wherein the instructions for updating the appearance of the condition list comprises at least one of striking out the first search condition, highlighting the first search condition, bracketing the first search condition, and modifying the appearance of the first search condition.

17. The apparatus of claim 11 further comprising instructions which, when executed by the processor, cause the processor to carry out the steps of:
receiving a second indication to delete from the filter logic expression information relating to the first identifier; and
deleting from the filter logic expression the information relating to the first identifier in response to receiving the second indication.

18. The apparatus of claim 17 wherein prior to receiving the second indication, the apparatus further comprises instructions which, when executed by the processor, cause the processor to carry out the steps of:
providing a user interface for displaying the filter logic expression;
scanning the filter logic expression to detect a reference to the first identifier; and
modifying an appearance of the detected reference to the first identifier in the filter logic expression.

19. The apparatus of claim 17 wherein the information relating to the first identifier includes at least one of the first identifier and an operator associated with the first identifier.

20. A non-transitory machine-readable medium carrying one or more sequences of instructions which, when executed by one or more processors, cause the one or more processors to carry out the steps of:
providing a filter logic expression comprising a plurality of search conditions separated by one or more Boolean operators, each of the plurality of search conditions being represented in the filter logic expression by an associated identifier;

providing a list of the plurality of search conditions with their associated identifiers, the plurality of search conditions being displayed in sequential order based upon the identifiers;

identifying a first search condition from the list of the plurality of search conditions in response to receiving a first indication to remove the first search condition from the list of the plurality of search conditions;

identifying a second search condition of the plurality of search conditions associated with a second identifier, wherein the second identifier sequentially follows the first identifier;

reassociating the second search condition with the first identifier in response to removing the first search condition from the list of the plurality of search conditions; and modifying the filter logic expression by automatically replacing any reference to the second identifier with the first identifier.

* * * * *